No. 607,932. Patented July 26, 1898.
C. HUSHAM.
FLEXIBLE METALLIC TUBE CONDUIT.
(Application filed Nov. 20, 1897.)
(No Model.)
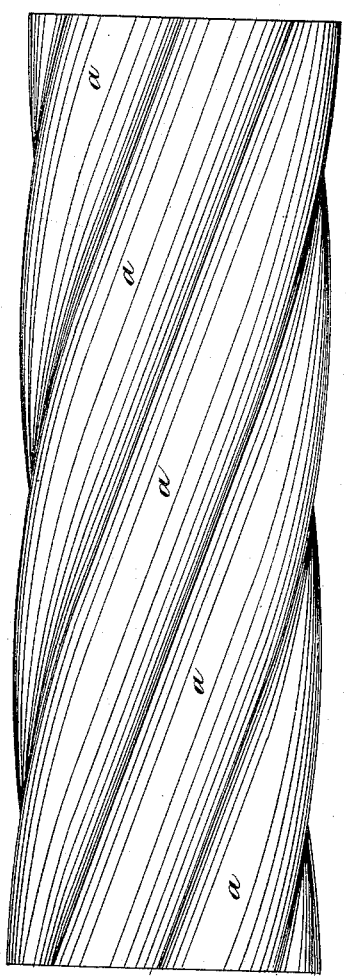
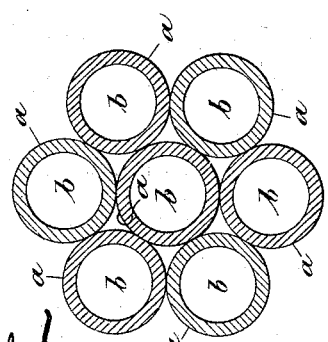
Witnesses. Inventor.

UNITED STATES PATENT OFFICE.

CARL HUSHAM, OF OSNABRÜCK, GERMANY, ASSIGNOR TO FELTEN & GUILLEAUME, OF MÜLHEIM-ON-RHINE, GERMANY.

FLEXIBLE METALLIC TUBE-CONDUIT.

SPECIFICATION forming part of Letters Patent No. 607,932, dated July 26, 1898.

Application filed November 20, 1897. Serial No. 659,272. (No model.) Patented in Germany September 24, 1895, No. 88,153.

*To all whom it may concern:*

Be it known that I, CARL HUSHAM, a subject of the German Emperor, residing at Osnabrück, in the German Empire, have invented a new and useful Flexible Metallic Tube-Conduit, (in respect whereof I have obtained a patent in Germany, No. 88,153, dated September 24, 1895,) of which the following is a specification.

This invention relates to the construction of flexible tube-conduits, the same being adapted for employment with great advantage for the conveyance of acids or of petroleum or when the tubes are to be laid on the beds of rivers or in similar situations where it has hitherto been customary to employ a number of very short inflexible and rigid tube-pieces, the work of laying being under such circumstances both difficult and expensive.

A flexible tube-conduit constructed according to my invention comprises several tubes or hollow wires which are stranded or twisted together, so as to constitute a rope-like conduit. The several strands of this rope-like conduit may be made of any suitable metal—such, for instance, as lead, copper, or iron.

In the accompanying drawings, Figure 1 is a transverse section of a flexible tube-conduit constructed according to my invention, wherein seven tubes are assembled together. Fig. 2 is a corresponding side elevation.

$a\ a$ are the walls of the hollow tubes or wires, $b$ being the bore or internal passage.

Although I have illustrated a tube-conduit comprising seven tubes, it will be understood that three, five, or more tubes may be assembled together, as thought desirable or as the purpose for which the conduit is intended may require, or several of such rope-like tube-conduits may be assembled to form a cable.

The labor incidental to transporting and laying such flexible tubes is simplified, as they may be brought to the locality of operation coiled upon reels, as commonly practiced with ropes.

What I claim as my invention, and desire to secure by Letters Patent, is—

A flexible conduit composed of several separate tubes laid up together like the strands of a rope, substantially as herein described.

CARL HUSHAM.

Witnesses:
   JOHN H. SCHNABEL,
   W. G. GERLACH.